Dec. 14, 1971     F. K. WHITE     3,626,763
SPECIFIC GRAVITY MEASURING DEVICE
Filed Feb. 18, 1970     2 Sheets-Sheet 1
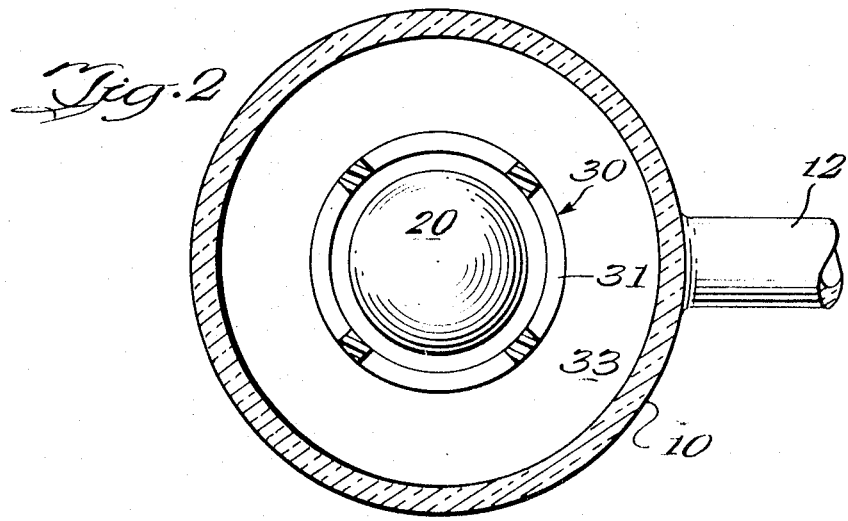
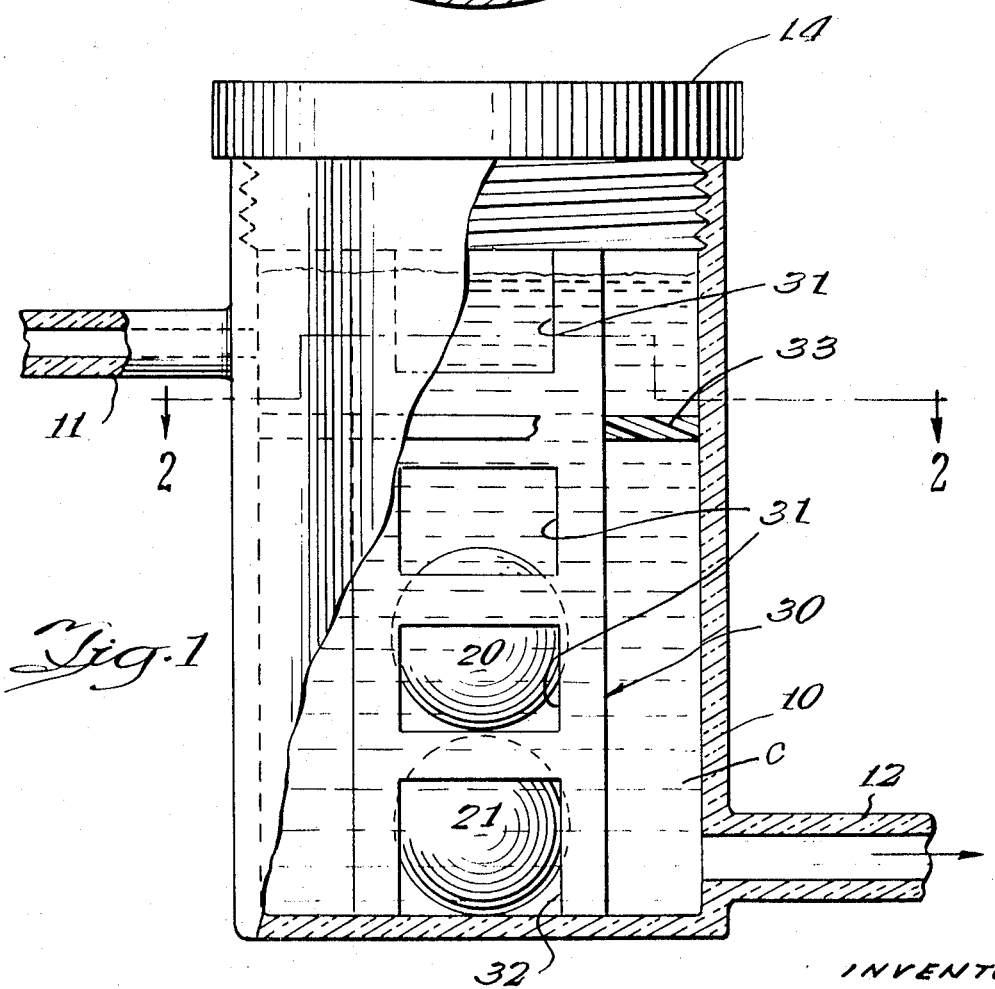
INVENTOR
Fred K. White
BY John L. Hutchinson
ATTORNEY Dec. 14, 1971    F. K. WHITE    3,626,763
SPECIFIC GRAVITY MEASURING DEVICE
Filed Feb. 18, 1970    2 Sheets-Sheet 2
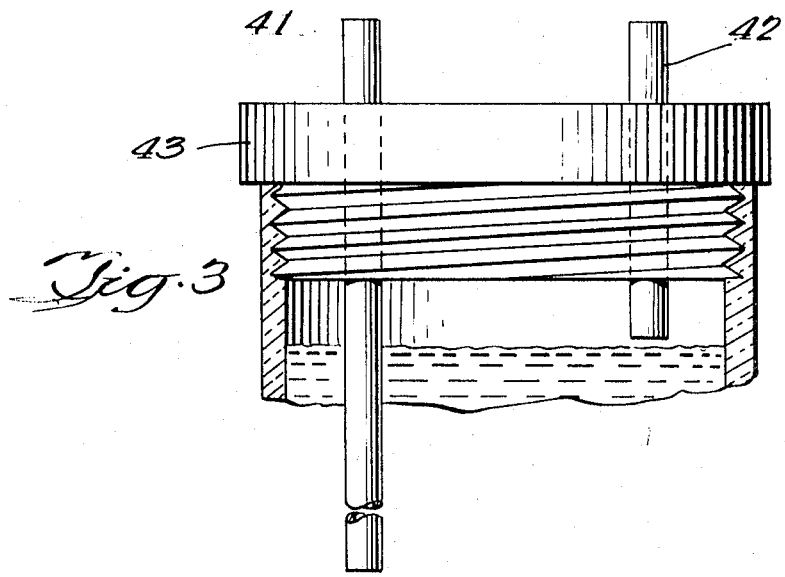
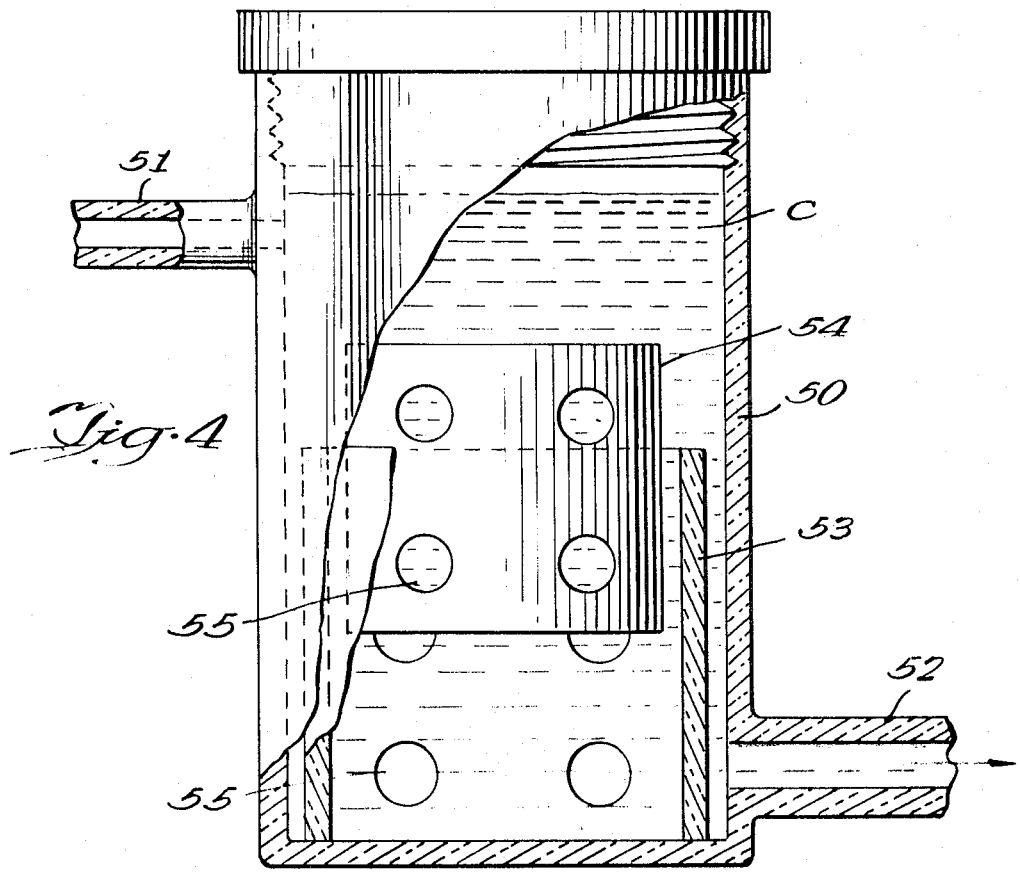
INVENTOR
Fred K. White
BY John L. Hutchinson
ATTORNEY

3,626,763
SPECIFIC GRAVITY MEASURING DEVICE
Fred K. White, Glen Ellyn, Ill., assignor to Mulwhiteson
Development Company, Glen Ellyn, Ill.
Filed Feb. 18, 1970, Ser. No. 12,334
Int. Cl. G01n 9/10
U.S. Cl. 73—440    3 Claims

ABSTRACT OF THE DISCLOSURE

This invention relates to a device for determining principally the changes in specific gravity of a fluid on a continuous basis. The device includes a vertically extending chamber containing a plurality of floatable elements. Each element is adapted to float at a different specific gravity. As fluid passes through the chamber, first one and then another element will float or settle, depending upon the specific gravity of the fluid. Changes in specific gravity of the fluid will be indicated by the rise or fall of the elements in the fluid.

DESCRIPTION OF THE INVENTION

Various devices have been developed for determining the specific gravity of a fluid. Frequently such devices are made of glass and, hence, are relatively expensive and fragile. Also, many of such devices due to their cost are not susceptible for use as expendable or disposable items. Additionally, prior devices are not generally designed to indicate changes in specific gravity of a fluid on a continuous basis.

Accordingly, it is an object of this invention to provide a device for use in determining the specific gravity of a fluid, and, more particularly, changes in specific gravity on a continuous basis.

Another object is to provide a device of the foregoing type which may be readily manufactured in large volume from relatively inexpensive materials.

These and other objects will become more apparent from the detailed description hereinafter and the attached drawings:

In the drawings:

FIG. 1 is an elevational view, partly in section, of one embodiment of the specific gravity device of this invention.

FIG. 2 is a view taken along line 2—2 of FIG. 1.

FIG. 3 is an elevational view of a modified closure for a device of the type contemplated.

FIG. 4 is a view, partly in section, of a further modification.

Referring initially to FIGS. 1 and 2 of the drawings, the numeral 10 designates an open end container enclosing a chamber C. In general, the container will be cylindrical, although it may be tapered at the top in the design of a bottle. For the purpose hereinafter described the container should be transparent, or, alternately, should be provided with transparent sections to permit a view of the chamber. The container may be manufactured of a transparent plastic which can be readily molded in large volume, such as polystyrene or a polymethacrylate, particularly if a disposable use is contemplated.

In order to permit continuous ingress and egress of fluid under test to and from the chamber, an inlet and outlet are provided, such as inlet 11 and outlet 12. These latter elements should be located in a manner that will insure substantial circulation and change of fluid in the chamber C, thus their location at the top and bottom, respectively, of the chamber or vice versa.

The top of the container is provided with a removable closure 14 which may be held in place by threads, as shown, or by a pressure or friction fit. However, for some applications a closure may be not be required.

Disposed within the chamber C are a plurality of floatable elements, such as the two spheres or balls 20 and 21 shown. Each of the balls is adapted to float at a different specific gravity. Various arrangements may be used for the balls within the chamber. For example, the balls may be merely disposed in the chamber in a side by side relationship. Alternately, each of the balls may have a diameter which is substantially equal to the diameter of the chamber C. In such an event, the balls will be arranged one above the other, with the ball adapted to float at the lower specific gravity disposed above the other ball within the chamber.

As shown in the drawing, a further modification contemplates a cage or retainer 30 for holding the balls in a desired superimposed position within the chamber. The cage 30 may have any appropriate design and may be made of any material which will permit the balls and their relative positions to be observed within the chamber. For example, the cage may be molded as a cylinder from the same transparent material as that of the container 10. In such an event the cage should be provided preferably with openings 31 and 32 to permit free circulation of fluid under test within the chamber and around the balls. The cage 30 may have a laterally extending flange 33 adapted to hold it in the desired position within the chamber.

The floatable elements may be of different sizes or shapes, or of different colors for contrast and to assist in more easily detecting changes in specific gravity under test.

The laterally extending inlet 11 and outlet 12 may be replaced by corresponding inlet and outlets, such as tubes 41 and 42, extending downwardly through the removable closure 43 of the container, as illustrated in FIG. 3. Preferably one such tube should be longer than the other, as shown, in order to insure adequate circulation of fluid under test within the chamber as it passes from inlet to outlet.

A further modification is illustrated in FIG. 4, wherein the floatable elements are not of a spherical or ball design. In this modification a container 50 is provided with a chamber C and an inlet 51 and outlet 52. The floatable elements shown consist of a plurality of concentrically disposed cylinders, such as cylinders 53 and 54. As illustrated, cylinder 54 having the smaller diameter is disposed within the larger diameter cylinder 53. Each of the cylinders is formed so as to float at a different specific gravity. For contrast the cylinders may be of different colors. Preferably, the cylinders should contain a plurality of openings 55 to permit free circulation of fluid under test throughout the chamber and between cylinders.

As an alternate a solid block of cylindrical form may be substituted for the smaller cylinder 54.

In operation, a source of fluid under test will be introduced to chamber C through the inlet 11 and removed from the chamber by means of the outlet 12 of FIGS. 1 and 2. As the fluid is passed through the chamber, its initial specific gravity may be such that none of the floatable elements will rise. If the specific gravity of the fluid changes, first one ball may rise and then the second, thereby indicating the changing specific gravity of the fluid under test. Alternately, the initial specific gravity of the fluid may be such that all elements float, and, as the specific gravity changes, first one element and then the other will drop to the bottom of the chamber. The relative position of the balls can be readily observed through the walls or transparent sections of the container.

The operation of the modification illustrated in FIG. 4 will be the same as that of FIG. 1, whereby the cylinders 53 and 54 will float or settle depending upon the specific gravity of fluid passing through the chambers.

A device of the type described may have a variety of uses from determining the specific gravity of urine of patients under treatment for a particular disease or condition to indicating the degree of pollution in rivers and streams.

Having described the invention and certain embodiments, the same is intended to be limited only by the scope of the following claims.

What is claimed is:

1. A device for determining the specific gravity of a fluid including a chamber, an ingress to and exit from said chamber to permit continuous passage of fluid through said chamber, two floatable elements disposed within the chamber each having a different specific gravity, one of said elements comprising a cylinder disposed concentrically about the second element.

2. A device as described in claim 1 wherein said second element is a cylinder.

3. A device as described in claim 1 wherein said second element is a cylindrical block.

References Cited

UNITED STATES PATENTS

| | | | |
|---|---|---|---|
| 1,625,047 | 4/1927 | Mowry | 73—440 X |
| 1,787,132 | 12/1930 | Orsdale | 73—452 |
| 1,956,984 | 5/1934 | Dunzweiler et al. | 73—440 |
| 2,348,520 | 5/1944 | Cardwell, Jr. | 73—440 |
| 2,396,470 | 3/1946 | Mortensen | 73—440 |
| 3,368,389 | 2/1968 | Barnett | 73—32 X |
| 3,460,395 | 8/1969 | Shaw | 73—440 |

RICHARD C. QUEISSER, Primary Examiner

E. J. KOCH, Assistant Examiner